G. C. KELLING.
FEEDING MECHANISM.
APPLICATION FILED FEB. 7, 1921.
1,394,908.
Patented Oct. 25, 1921.
3 SHEETS—SHEET 1.
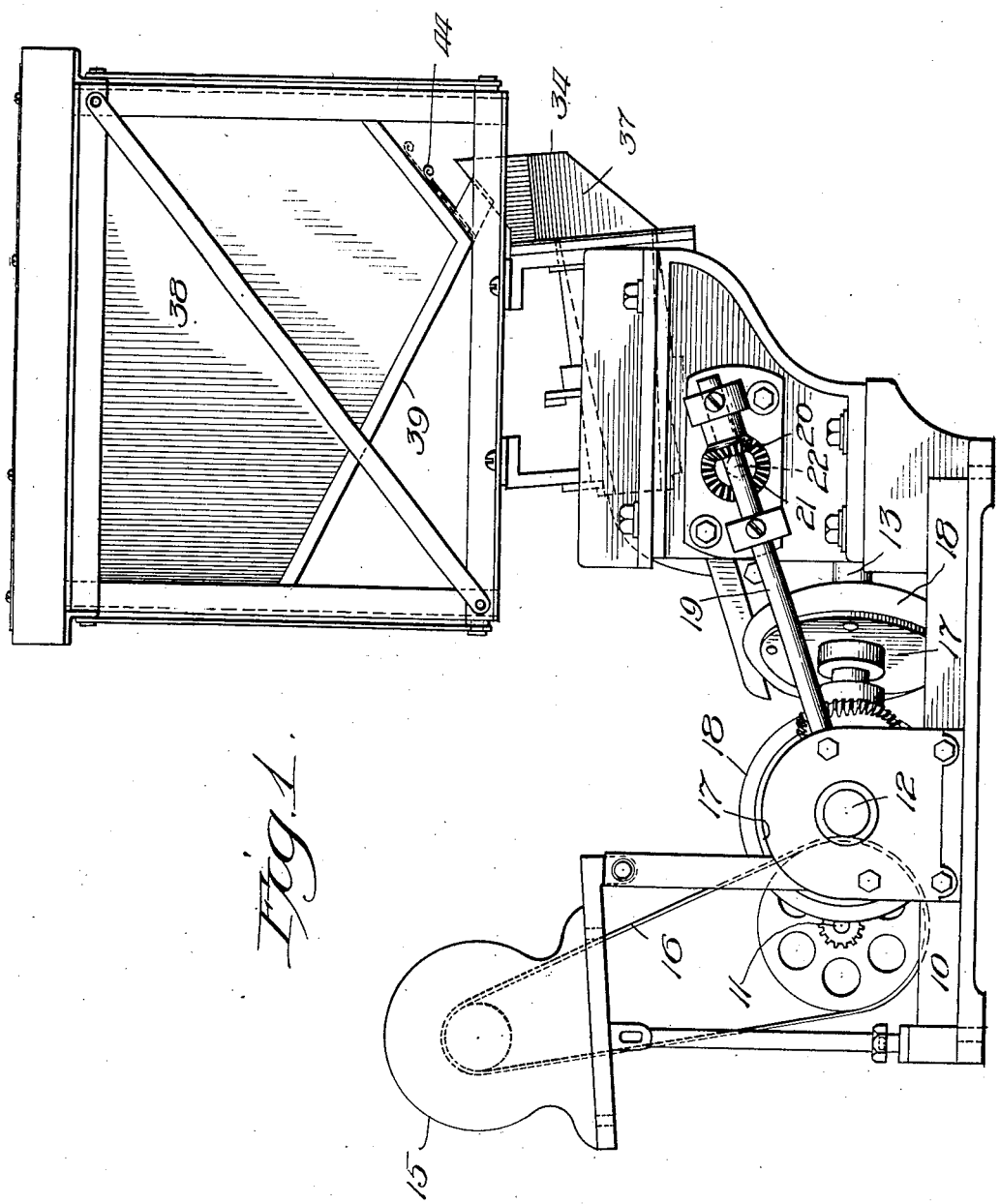
Inventor
Gustave C. Kelling
by Dyrenforth, Lee, Chritton & Wiles
A

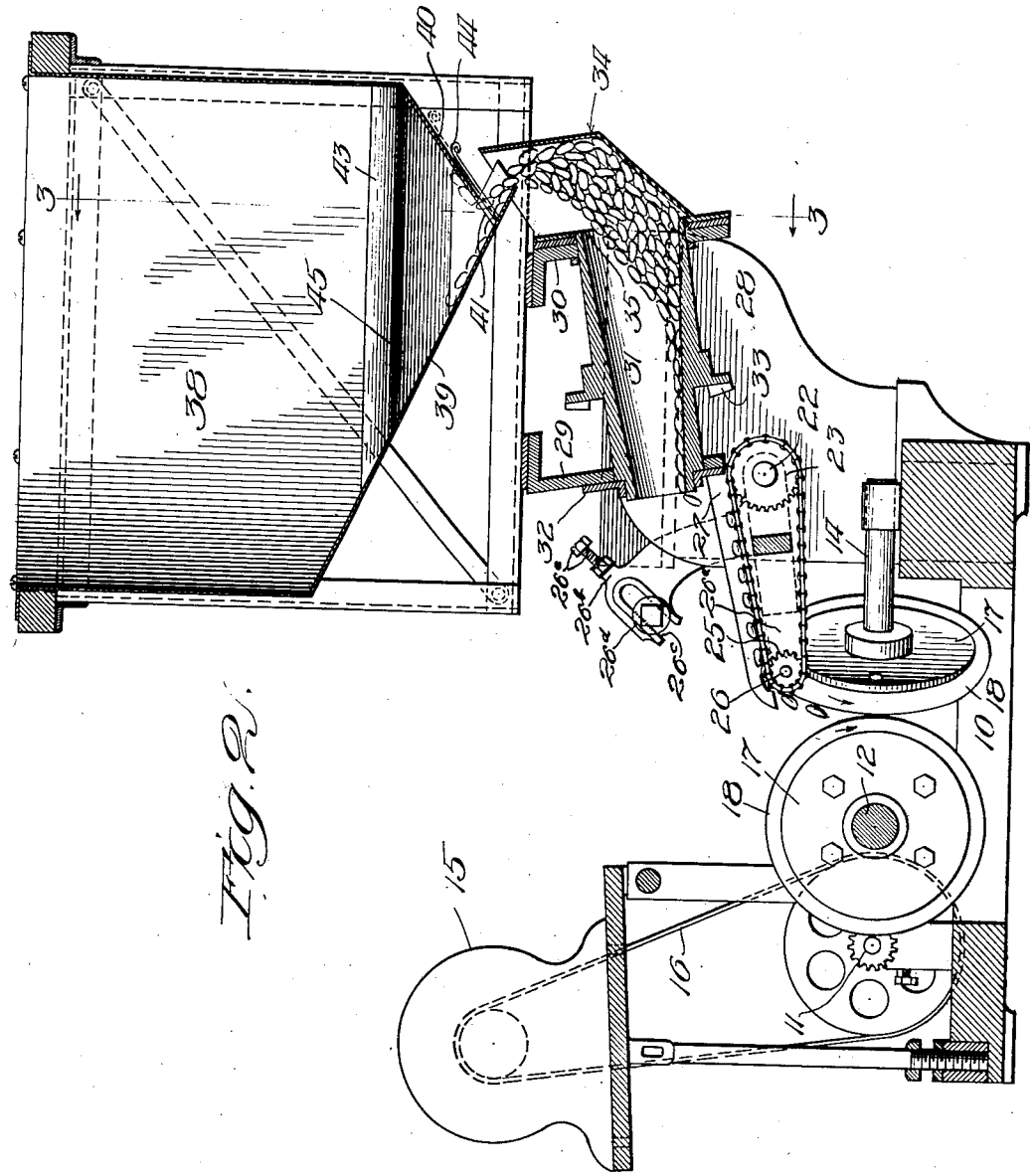

G. C. KELLING.
FEEDING MECHANISM.
APPLICATION FILED FEB. 7, 1921.
1,394,908.
Patented Oct. 25, 1921.
3 SHEETS—SHEET 3.
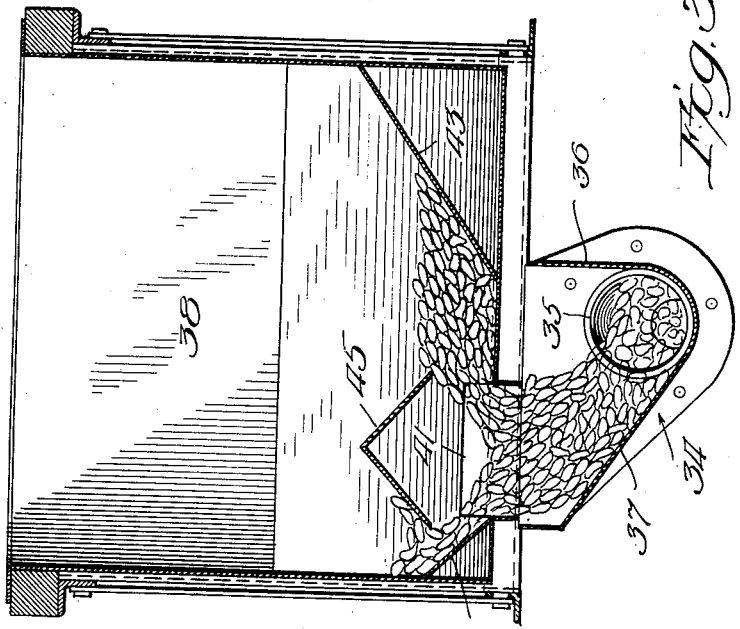
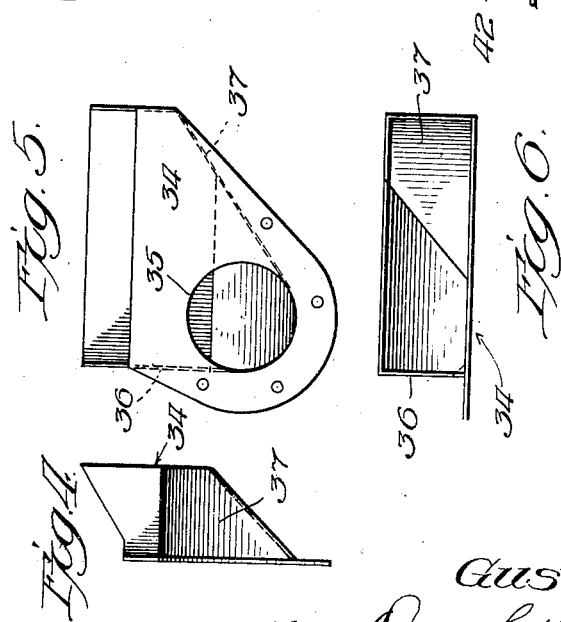
Inventor
Gustave C. Kelling
by Dynforth, Lee, Chritton & Niles
Attys

UNITED STATES PATENT OFFICE.

GUSTAVE C. KELLING, OF CHICAGO, ILLINOIS.

FEEDING MECHANISM.

1,394,908.  Specification of Letters Patent.  Patented Oct. 25, 1921.

Application filed February 7, 1921. Serial No. 442,977.

*To all whom it may concern:*

Be it known that I, GUSTAVE C. KELLING, a citizen of the United States, residing at Chicago, in the county of Cook and State of Illinois, have invented a new and useful Improvement in Feeding Mechanism, of which the following is a specification.

This invention relates to mechanism for feeding peanuts and the like and is particularly adapted to be used to feed peanuts to blanchers where it is highly desirable that the peanuts shall be fed at fairly definite intervals and with the end of the peanuts fed first into the peanut blancher.

The invention is fully described in the following specification and shown in the accompanying drawings, in which—

Figure 1 is a side elevation of a peanut blancher equipped with my feeding mechanism;

Fig. 2 is a longitudinal vertical section through the blancher and feeding mechanism;

Fig. 3 is a section on the broken line 3—3 of Fig. 2; and Figs. 4, 5 and 6 are respectively side and front elevation and plan view of the chute.

The feeding mechanism is herein shown in connection with a peanut blancher such as is disclosed in my pending application Serial No. 401,706. This blancher consists of a frame 10 having bearings in which are journaled shafts 11, 12, 13 and 14. The shaft 11 is driven by the motor 15 and the belt 16 and is geared to the shaft 12 which in turn drives the shafts 12 and 13, which with the shaft 12 form substantially an equilateral triangle, by suitable bevel gears. These gears are so proportioned that all three shafts turn at different speeds and each carries a wheel 17 having a soft rubber face 18. These faces are set substantially 120° apart and have but a small amount of clearance between them so that as peanut kernels are fed thereto as will later be described, the thin brown skin will be torn from the peanut and it will be "blanched" as it passes through these wheels.

The shaft 19 is journaled in suitable bearings in the frame and is driven by a bevel gear (not shown) on the shaft 12 and has a bevel gear 20 which meshes with the bevel gear 21 on the shaft 22 by means of which the latter is driven. This shaft carries a sprocket 23 which drives a small chain conveyer 24 which passes over the sprocket 25 on the tail shaft 26, which is carried by a frame $26^a$, which is rotatably mounted on the shaft 22. This frame has an arm $26^b$, which has a slotted end $26^c$ fitted on the bolt $26^d$, and an adjusting screw $26^e$. By raising and lowering the shaft 26, the distance the peanut falls to reach the blanching wheels can be regulated. It is usually desirable to lower this shaft so as to make this distance as small as possible. This is made possible by placing the conveyer between two of the wheels and directly opposite the third.

The upper strand of this conveyer has converging sides 27 which lie close to the conveyer chain and serve as guiding and alining means for the peanut kernels which are carried by the conveyer. One of the sides is perpendicular and the other inclined at the upper or receiving end. This assists materially in alining the peanuts on the conveyer, and prevents the peanuts from becoming lodged between these converging sides.

The member 28 which serves to carry the shaft 22 also carries the bearing members 29 and 30 having alined openings in which the hollow conical tubular member 31 is journaled. This member has a shoulder lower end over which the plate 32 is loosely fitted for retaining the member 31 in the bearings. The member 31 has a bevel gear 33 formed thereon by which it is driven through suitable gearing (not shown) from the shaft 22. The conical opening in the member 31 is placed with the small end of the opening immediately over the conveyer 24 and the larger end communicating with the chute 34 by means of the circular opening 35 therein as shown in Fig. 5.

This chute has a straight side 36 which preferably rises substantially perpendicularly from the side of the opening 35 while the opposite side 37 is made sloping so as to carry the upper end of the chute off to one side of the center of the tube 31 as shown in Fig. 3.

A hopper 38 is supported above the tube 31 and has bottom members 39 and 40 which slope toward the opening 41 as shown in Fig. 2. The bottom members 42 and 43 as shown in Fig. 3 are also preferably made sloping toward this opening which is controlled by means of the sliding cover 44, which is slidably mounted in grooves on the inner side of the bottom member 40.

A hollow arched member 45 is placed across the hopper and above the opening 41 so as partly to support the weight of peanut kernels which lie above this arch and to prevent them from exerting too much pressure upon the opening 41.

The operation of this feeding mechanism is as follows: Peanut kernels which are to be blanched are placed in the hopper 38 and the motor 15 set in operation. These kernels will find their way by gravity down through the opening 41 into the chute 34 pile up somewhat at the upper end of the tubular member 31 as shown in Fig. 2. As this tube is then slowly turned the peanuts at the bottom of the pile will gradually push one another along the gradual incline and will roll out one at a time upon the conveyer 24 and be carried thereby over the end of the conveyer and deposited point first between the crotch formed by the three rubber faced wheels 18. As these wheels turn the peanut will be forced down between them and the differential motions of these wheels will cause the thin brown skin to be torn from the kernel which will then drop on through into a bin.

While I have shown and described but a single embodiment of my invention, it is to be understood that it is capable of many modifications. Changes therefore in the construction and arrangement may be made which do not depart from the spirit and scope of my invention as disclosed in the appended claims in which it is my intention to cover all novelty inherent in the invention as broadly as possible in view of the prior art.

What I claim as new, and desire to secure by Letters Patent, is:

1. In mechanism for feeding peanuts and the like, a hopper, a tubular member, means for rotating said member, a chute connecting the hopper and rear end of the tubular member, and means for regulating the feed of peanuts from the hopper to the tubular member, whereby the peanuts will be fed therefrom one at a time.

2. In mechanism for feeding peanuts and the like, a hopper, a tubular member, the bottom element of which slopes toward the forward end, means for rotating said member, a chute connecting the hopper and rear end of the tubular member, and means for regulating the feed of peanuts from the hopper to the tubular member, whereby the peanuts will be fed therefrom one at a time.

3. In mechanism for feeding peanuts and the like, a hopper, a tubular member of conical form, the bottom element of which slopes toward the forward end, means for rotating said member, a chute connecting the hopper and rear end of the tubular member, and means for regulating the feed of peanuts from the hopper to the tubular member, whereby the peanuts will be fed therefrom one at a time.

4. In mechanism for feeding peanuts and the like, a hopper, a tubular member, means for rotating said member, a chute connecting the hopper and rear end of the tubular member, and a conveyer located beneath the forward end of the tubular member and operably connected thereto.

5. In mechanism for feeding peanuts and the like, a hopper, a tubular member, means for rotating said member, a chute connecting the hopper and rear end of the tubular member, said chute being off center and sloping forwardly and toward the center, an opening from the hopper to the chute and means for withholding the full pressure of the peanuts from said opening.

6. In mechanism for feeding peanuts and the like, an inclined tubular member, means for rotating said member and means for feeding peanuts to the upper end of said member, whereby the peanuts will be fed one at a time from the lower end of the tubular member.

7. In mechanism for feeding peanuts and the like, an inclined conical tubular member, means for rotating said member and means for feeding peanuts to the upper end of said member, whereby the peanuts will be fed one at a time from the lower end of the tubular member.

8. In mechanism for feeding peanuts and the like, an inclined tubular member, means for rotating said member and means for feeding peanuts to the upper end of said member, whereby the peanuts will be fed one at a time from the lower end of the tubular member, a conveyer under the lower end of said tubular member adapted to receive the peanuts therefrom and means for driving said conveyer.

GUSTAVE C. KELLING.